United States Patent

[11] 3,575,061

[72] Inventor Benjamin T. Howes
     Birmingham, Mich.
[21] Appl. No. 879,466
[22] Filed Nov. 24, 1969
[45] Patented Apr. 13, 1971
[73] Assignee Ford Motor Company
     Dearborn, Mich.

[54] TORSION ROD SHIFT MECHANISM FOR TRANSMISSION
     6 Claims, 6 Drawing Figs.
[52] U.S. Cl. .................................................. 74/473SW,
                                                              74/484
[51] Int. Cl. ....................................................... G05g 9/02
[50] Field of Search ............................................ 74/473,
                                    475, 476, 477, 484, 485, 473 (SW)

[56] References Cited
     UNITED STATES PATENTS
     3,242,757  3/1966  Winkler et al. ............... 74/473
     3,364,778  1/1968  Griffen et al. ................. 74/473

Primary Examiner—Milton Kaufman
Attorneys—John R. Faulkner and Donald J. Harrington ABSTRACT: A shift linkage mechanism for use with a multiple ratio power transmission mechanism in an automotive vehicle driveline comprising a torsion rod mounted for universal movement on a fixed part of the vehicle body, a personally operable gearshift lever and a linkage arrangement connecting one end of the gearshift lever to one end of the torsion rod, the other end of said torsion rod being connected to transmission ratio-controlling elements.

Patented April 13, 1971

INVENTOR:
Benjamin T. Howes
BY
ATTORNEYS.

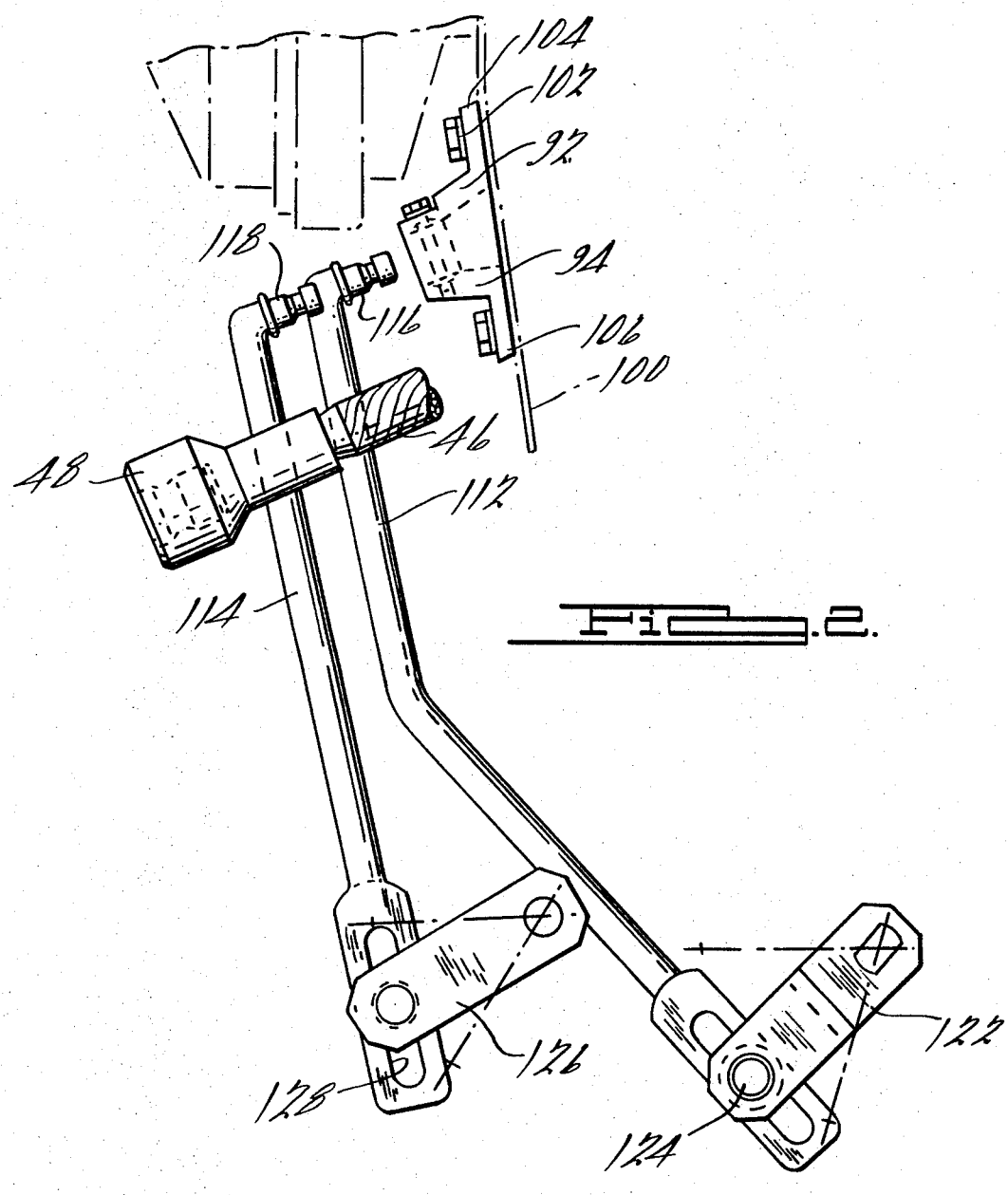

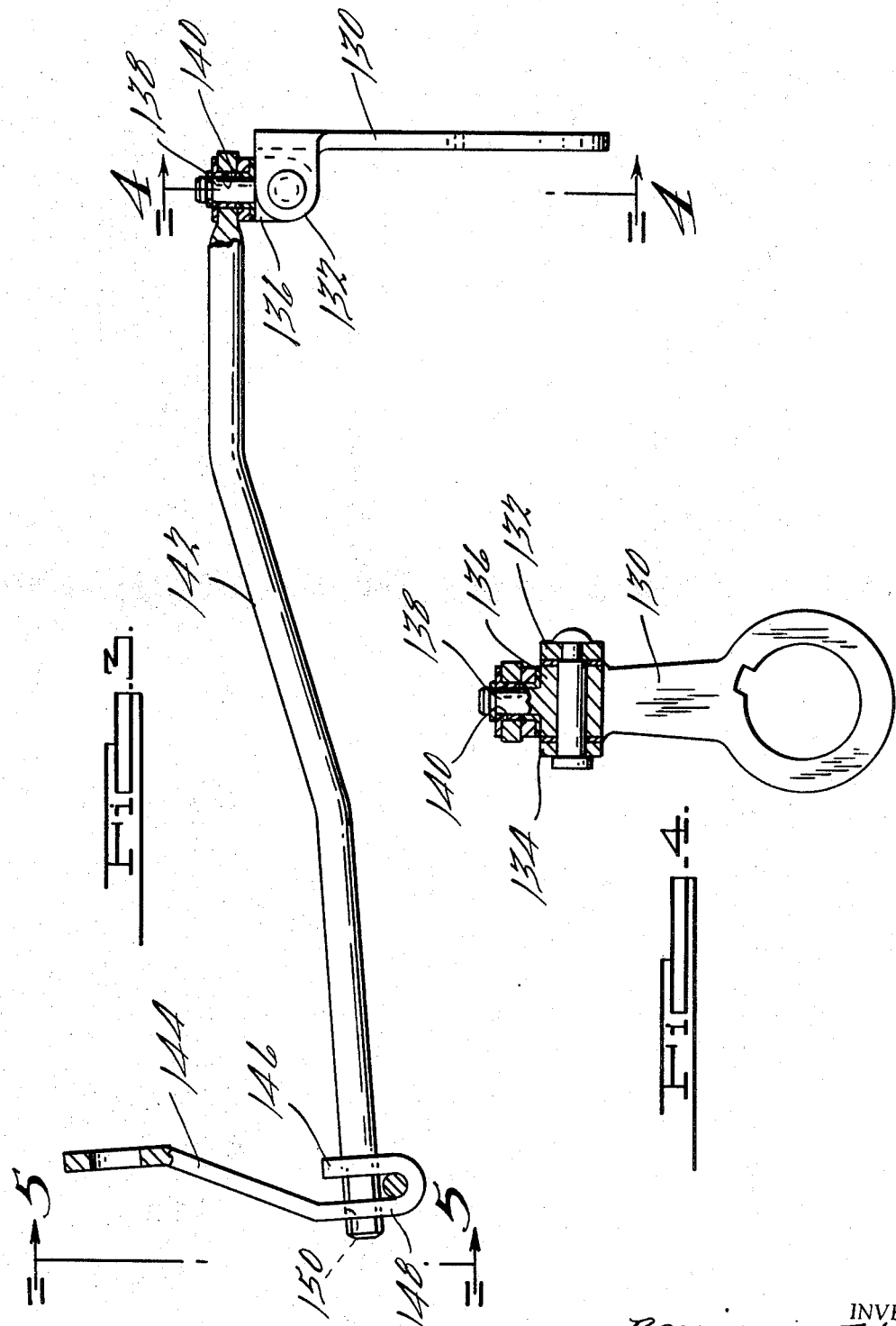

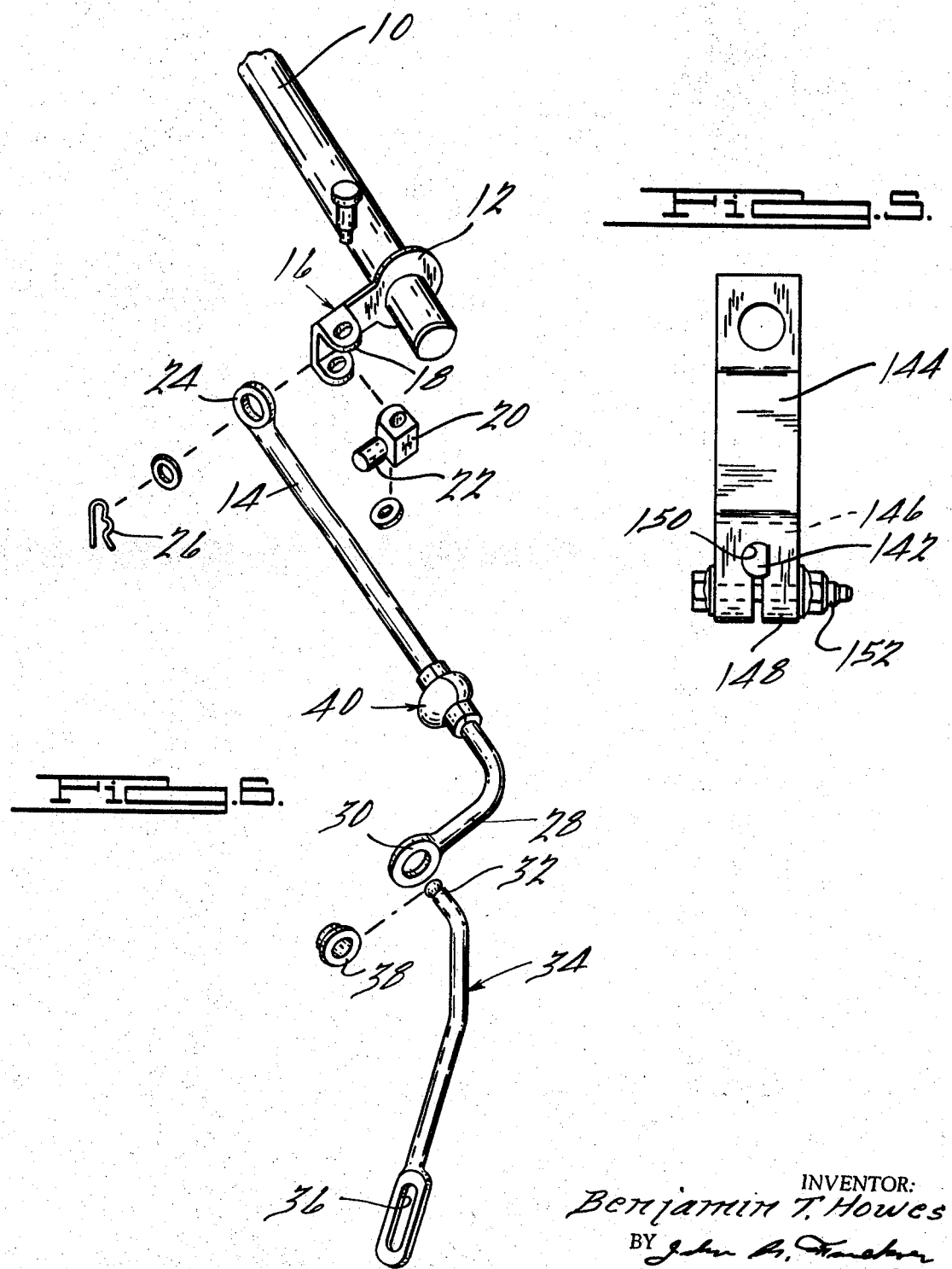

TORSION ROD SHIFT MECHANISM FOR TRANSMISSION

GENERAL DESCRIPTION OF THE INVENTION

The improvements of my invention are adapted to be used in automotive vehicles in which the steering mechanism for the vehicle includes a steering column located partly in the engine compartment of the vehicle. Space limitations within the engine compartment often make it difficult or impossible to locate conventional transmission ratio-controlling linkage elements on the steering column structure within the vehicle engine compartment. In my improved design the steering column includes a foreshortened main portion connected to driven portions of the steering mechanism by means of a flexible cable that is capable of accommodating steering torque applied to the steering system by the vehicle operator.

The shift-controlling linkage mechanism of my invention includes elements adapted to be used with such a foreshortened steering column. It includes a transmission selector sleeve which is supported within the vehicle engine compartment by the steering column assembly. The gear shift levers are mounted on the foreshortened column within the engine compartment and are adapted to be connected to the sleeve by means of a selectively engageable clutch. A torsion rod is journaled at or on the sheet metal dash structure between the engine compartment and the passenger compartment of the vehicle. It is connected at one end to the shift levers and at the other end to transmission shift links. The other end of the shift links in turn are connected to the transmission ratio-controlling levers.

The connection between the shift levers and the associated ends of the torsion rod is capable of accommodating universal movement. As the transmission selector sleeve is moved rotatably, a torque is applied to the torsion rod thereby causing the end of the torsion rod within the engine compartment to rotate. This rotation is translated into translatory motion of the transmission shift link which in turn causes rotation in one direction or the other of the transmission ratio-controlling levers.

The shape of the torsion rod can be chosen so that interference between it and other vehicle components within the engine compartment is avoided. By properly choosing the characteristics of the shift lever, the length of the torsion rod, the shape of the torsion rod and the characteristics of the transmission shift link, the proper shift geometry can be achieved for the ratio-controlling elements of the transmission.

If the steering column is designed to collapse under impact loading, the collapsing motion of the steering column will not be interfered with by the torsion rod shift linkage mechanism of my invention.

BRIEF DESCRIPTION OF THE FIGURES OF THE DRAWING

FIG. 2 is a side elevation view of the structure of FIG. 1.

FIG. 3 is a subassembly view of a torsion rod portion of a shift linkage mechanism for a second embodiment of the invention.

FIG. 4 is viewed partly in section as seen from the plane of section line 4-4 of FIG. 3.

FIG. 5 is a view partly in section as seen from the plane of section line 5-5 of FIG. 3.

FIG. 6 is a schematic representation of my improved shift linkage mechanism with the parts of the mechanism shown in relatively displaced or exploded disposition.

PARTICULAR DESCRIPTION OF THE INVENTION

Figure 1:
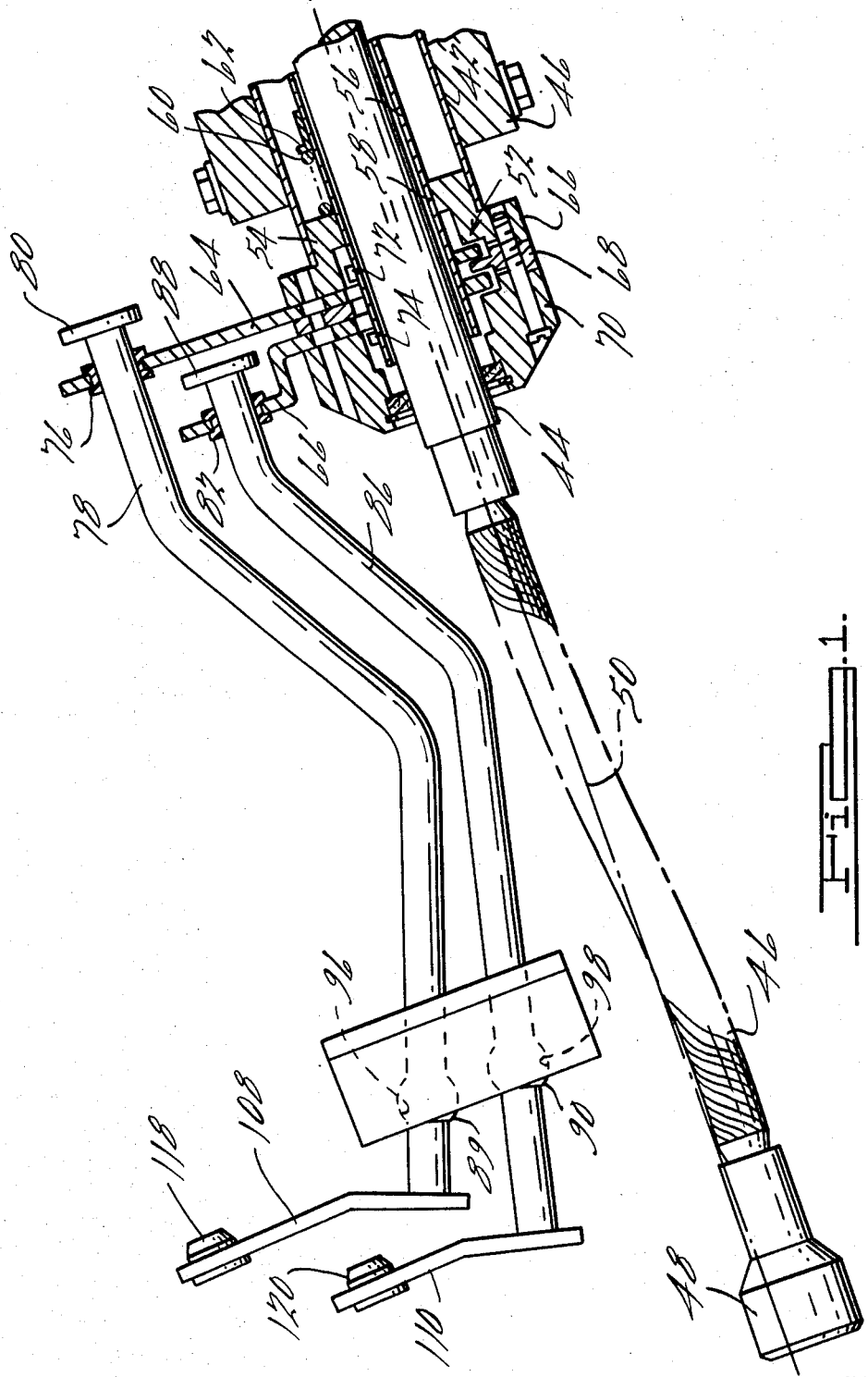
FIG. 1 shows a plan view, partly in cross section, of a vehicle-steering column and gearshift control linkage.

Reference will be made first to FIG. 6 for the purpose of describing a simplified linkage embodying the principles of my invention. Numeral 10 in FIG. 6 designates the gearshift selector tube which is journaled for rotation about the axis of the steering column for the vehicle. This selector tube can be rotated about its axis by the vehicle operator as ratio selections are made. The lower end of the selector tube 10 has secured thereto a shift arm 12 which rotates with the tube 10 about its axis. The arm 12 extends radially outwardly and is secured to one end of a torsion rod 14 by means of a universal connection 16.

In the embodiment of FIG. 6 the universal connection 16 includes a yoke having a pair of eyelets 18 which receive the pivot shaft of a swivel block 20. Another shaft 22 on the block 20 is received through an eyelet 24 formed on the end of the torsion rod 14. The eyelet 24 is held fast on the swivel block by a clip 26.

The lower end of the torsion rod 14 is bent to form a motion output arm 28. The end of this arm 28 forms an eyelet 30 which receives one end 32 of a transmission shift linkage 34. The other end of the shift linkage 34 is adapted to be connected to the transmission shift linkage for the vehicle transmission mechanism. A suitable adjustment slot 36 is provided in the end of the rod 34 to permit suitable linkage adjustments.

A polyurethane grommet 38 is used in the eyelet 30 to reduce friction between the torsion rod and the shift link 34.

A spherical bearing 40 supports an intermediate part of the torsion rod 14. It comprises a split bushing, the individual parts surrounding the rod 14. The spherical portion of the bearing 40 is received in a socket member carried by the vehicle dash structure so that the rod 14 is mounted for universal movement about the bearing point provided by the bearing 40.

Upon rotation of the selector tube 10, the arm 12 carries the end 24 in rotary motion about the axis of the tube 10. This rotary motion is translated into a rotary motion of the end of the arm 28 by reason of the universal movement provided by the spherical bearing 40. The translatory motion of the end of the arm 28 causes adjustment of the shift link 34 thereby effecting transmission ratio changes.

The geometry of the torsion rod 14 determines the shift pattern made available upon shifting movement of the selector tube 10. This geometry can be chosen to satisfy any particular installation requirements for a given transmission design.

Only a single torsion rod is illustrated in FIG. 6. I contemplate, however, that two such rods would be required if two transmission ratio changing levers are used in the transmission system such as in a manual transmission installation. A single rod would be required in the case of an automatic transmission where a single manual valve accomplishes a ratio selection, the manual valve in turn being under the control of the vehicle operator.

In the embodiment of FIG. 1 through 5, I have illustrated an embodiment of my invention which is adapted to be used especially with manually controlled transmission mechanisms as distinct from automatic transmissions mechanisms. In FIG. 1 the vehicle-steering column is designated by reference character 42. The steering column 42 is foreshortened in order to avoid interference between the column and the components located within the vehicle engine compartment. The right hand or upper end of the column 24 supports a vehicle-steering wheel situated in the vehicle passenger compartment.

The vehicle-steering shaft 44 is journaled rotatably in the column 42, the latter in turn being supported by bracket structure shown in part at 46. This structure is secured directly to the vehicle dash. A flexible cable 46 connects the end of the shaft 44 with driven portions of the steering gear system, the motion output end of the cable 46 forming a socket 48 which receives one end of a driven shaft component of the steering gear system. The cable 46 is displaced away from the centerline 50 of the steering column in order that interference might be avoided between the steering elements and the other components in the vehicle engine compartment. Upon rotation of the shaft 44, rotary motion is imparted to the end 48 as the cable 46 flexes.

A linkage support 52 is secured to the lower end of the tube 42. It is provided with an extension 54 received within the tube 42.

The lower end of a gearshift selector tube 56 is slidably positioned in bearing opening 58. A spring 60 seated against the member 54 surrounds the tube 56. A reaction shoulder 62 connected to the tube 56 is engaged by the spring 60 so that the tube 56 is urged normally in an upward direction.

A gearshift lever 64 is supported by the column 56 and is enclosed within the support 52. The second gearshift lever 66 is supported by the column 56 within the support 52 at a location adjacent lever 64. Support 52 is slotted to permit the levers 64 and 66 to extend radially outwardly therefrom. The support 52 can be formed in three parts stacked together as shown at 66, 68 and 70. These can be bolted together to form a unitary assembly.

The lower end of tube 56 carries a pair of clutch elements in the form of lugs 72 and 74. Lug 72 adapted to engage a slot in lever 64 so that when the lug 72 is shifted downwardly, a driving connection is established between the tube 56 and the lever 64. At the same time lug 74 is disengaged from the corresponding slot in the lever 66. Rotation of the tube 56, when it is shifted downwardly, causes rotation of the lever 64 in either one direction or the other or the connection between tube 56 and lever 66 is interrupted.

Upon shifting movement of the tube 56 in the opposite direction, the connection between the lever 64 and the tube 56 is interrupted and a connection is established between the lever 66 and the tube 56 through the lug 74. Subsequent rotation of the tube 56 in either direction will cause angular adjustment of the lever 66.

The radially outward end of the lever 64 is provided with an opening in which a plastic grommet 76 is received. This grommet provides a bearing support for one end of a torsion rod 78. Movement of the rod 78 in one direction relative to the lever 64 is prevented by a shoulder 80 carried by the rod 78. The radially outward end of the lever 66 also is provided with an opening in which is received a plastic grommet 82. Axial movement of the rod 86 with respect to the lever 66 is prevented by shoulder 88 upon the rod 86.

A spherical bearing portion 89 is carried by the rod 78. A corresponding spherical bearing portion 90 is formed on the rod 86. A pair of socket members 92 and 94 form a pair of socket openings 96 and 98 which receive, respectively, the spherical bearing portions 89 and 90. Members 92 and 94 are bolted through a forward wall 100 of the vehicle body structure by means of bolts 102. These are received within bolt openings formed in flanges 104 and 106 on the members 92 and 94 respectively.

The members 92 and 94 are joined together in a butting relationship. One half of each of the spherical bearing openings 96 and 98 is formed by each of the members 92 and 94. A universal connection thus is established for each of the rods 78 and 86 between an intermediate portion of each rod and the relatively stationary body structure 100.

One end of the rod 78 has secured thereto a transmission lever 108. A corresponding lever 110 is secured to the lower end of the rod 86. A pivotal connection is established between the radially outward end of the lever 108 and a transmission control rod 112. A similar connection is established between the radially outward end of the lever 110 and a second transmission control rod 114. Control rod 112 is formed with a right-angle portion 116 which is received within a grommet 118 carried by the end of the lever 108 in a similar fashion. The end of the control rod 114 is formed with a right-angle portion 118 which is received within a grommet 120 carried by the end of the lever 110.

The lower end of the control rod 112 is connected to transmission control lever 112 by means of a slot and pin connection 124. This connection permits adjustment of lever 122 with respect to the rod 112. Lever 122 in turn controls engagement and disengagement of the reverse drive gear and the low speed forward drive ratio gear in the transmission mechanism (not shown).

When the lever 122 is moved in a clockwise direction to one extreme position, the transmission mechanism is conditioned for reverse drive movement of the lever 122 in the clockwise direction to the other extreme position will condition the transmission for operation in the first or low speed forward driving ratio. When the lever 122 is moved to an intermediate position, which is shown in FIG. 2, the reverse and low gearing is conditioned for neutral.

The lower end of the control rod 114 is connected to transmission control lever 126 by means of an adjustable pin and slot connection 128. When the lever 126 is moved in the clockwise direction to one extreme position, the transmission mechanism is conditioned for intermediate speed ratio forward drive operation. When it is shifted in the other direction to the other extreme position, the transmission mechanism is conditioned for high-speed ratio or third forward driving speed ratio operation. The position shown for lever 126 in FIG. 2 is the neutral position which is located between the two extreme positions.

It is apparent from both the embodiments shown in FIGS. 1 through 5 and in the embodiment of FIG. 6 that the motion pattern for the transmission valve lever is obtained by the mode of adjustment of the torsion rods as one end of the torsion rod is angularly adjusted about the axis of the steering column. The torsion rods, by reason of the torque imparted thereto by the levers carried by the shift selector tube, translate rotary motion into a reciprocating motion of the transmission control rods 112 and 114. In this way the use of complicated pivotal connections between multiple lever elements and numerous fulcrum points is not necessary as shifting motion is imparted to the transmission control levers by the vehicle operator where movement of the selector tube in a predetermined motion pattern during ratio changes. The torsion rods themselves can be located in any one of the variety of positions without unduly interfering with the resulting motion pattern of the output elements of the linkage system. Thus the shift linkage mechanism can be arranged for optimum economy of space in the vehicle engine compartment.

In the embodiment of FIGS. 1 and 2 rotary motion of the levers 64 and 66 must be accompanied by a limited sliding movement of the torsion rods within the grommets carried by the levers 64 and 66. In the embodiment of FIGS. 3, 4 and 5 I have shown an alternate torsion rod and lever assembly. It includes a low-and-reverse lever 130 which is connected to and supported by the shift tube 56 in the manner previously described with respect to the low-and-reverse lever 64. The radially outward end of the lever 130 is provided with a pair of ears 132 and 134 between which a pivot block 136 is received. The block is pinned to an opening formed in the ears 132 and 134. Block 136 is provided with a post 138 received within an opening 140 formed in the end of torsion rod 142. A suitable bushing is provided between the post 138 and the opening 140.

The connection between the opposite end of the torsion rod 142 and the shift lever 144 is shown with respect to FIGS. 3 and 5. Lever 144 corresponds to the lever 108 in the embodiment of FIGS. 1 and 2.

The radially inward end of the lever 144 is bent as shown to provide spaced fingers 146 and 148. A noncircular opening 150 is formed in the fingers 146 and 148 and the end of the rod 142 is received through the opening 150. A flat surface is formed on the end of the rod 142 so that it will register with the noncircular opening 150. A clamping bolt 152 is received within the space provided by the bent end of the lever 144 os that the arms 146 and 148 can be clamped on the end of the rod 142.

A rod similar to that shown in FIGS. 3, 4 and 5 can be used also for the intermediate-and-high shift lever which would correspond to lever 110 in the FIG. 1 and FIG. 2 embodiment.

Although the spherical bearing for the rod 142 is not shown in the drawings, a center bearing would be provided for the rod 142 just as the case of the other embodiment.

Having thus described a preferred embodiment of my invention, what I claim and desire to secure by U.S. Letters Patent is:

I claim:

1. A torsion rod gearshift mechanism for use in an automotive vehicle driveline for controlling ratio changes in a multiple ratio power transmission mechanism, said gearshift mechanism comprising a personally operable shift selector shaft, said selector shaft being adapted for rotation about its axis from one operating position to another, a first shift lever secured to said selector shaft and rotatable therewith about the axis of said selector shaft, a torsion rod having one end offset with respect to the other, one end of said torsion rod being connected to the radially outward end of said first shift lever, the other end of said torsion rod being connected to a second shift lever, a universal pivot connection between a portion of said torsion rod intermediate its ends and a relatively stationary portion of said mechanism whereby said torsion rod is supported for universal movement, and a mechanical connection between the radially outward end of said second shift lever and ratio-controlling portions of said transmission mechanism.

2. In a transmission shift-controlling mechanism for use in an automotive vehicle driveline installation, a steering column mounted transmission ratio-controlling shift tube, said shift tube being journaled for rotation about the axis of said steering column, a first shift lever carried by one end of said shift tube, a torsion rod having one of its ends offset with respect to the other, a connection between one end of said first shift lever and one end of said torsion rod whereby said one end of said torsion rod is rotated about the axis of said shift tube upon rotation thereof by the vehicle operator, a second shift lever connected to the other end of said torsion rod whereby said second shift lever rotates with said other rod end, a universal pivot support for a portion of said rod intermediate its ends, said support including a universal connection between means adapted to be connected to fixed structure and said rod whereby angular adjustment of each end of said rod is accommodated, and a mechanical connection between the radially outward end of said end lever and ratio-controlling portions of said transmission mechanism.

3. A torsion rod gearshift mechanism for use in an automotive vehicle driveline for controlling ratio changes in a multiple ratio power transmission mechanism, said gearshift mechanism comprising a personally operable shift selector shaft, said selector shaft being adapted for rotation about its axis from one operating position to another, a first shift lever adapted to be connected to said selector shaft and rotatable therewith about the axis of said selector shaft, a torsion rod having one end offset with respect to the other, one end of said torsion rod being connected to the radially outward end of said first shift lever, the other end of said torsion rod being connected to a second shift lever, a universal pivot connection between a portion of said torsion rod intermediate its ends and means adapted to be connected to stationary structure whereby said torsion rod is supported for universal movement, and a mechanical connection between the radially outward end of said second shift lever and ratio-controlling portions of said transmission mechanism, a second torsion rod having a configuration generally similar to the configuration of said first mentioned torsion rod, a third shift lever adapted to be connected to said selector shaft, a fourth shift lever connected to and movable with the other end of said second torsion rod, a universal pivot connection between fixed portions of said mechanism and an intermediate portion of said second torsion rod, a mechanical connection between radially outward end of said fourth shift lever and other ratio-controlling portions of said mechanism, and clutch means for selectively engaging and disengaging said first and third shift levers with respect to said selector shaft.

4. In a transmission shift-controlling mechanism for use in an automotive vehicle driveline installation, a steering column mounted transmission ratio-controlling selector shaft, said selector shaft being journaled for rotation about the axis of said steering column, a first shift lever carried by one end of said selector shaft, a torsion rod having one of its ends offset with respect to the other, a connection between one end of said first shift lever and one end of said torsion rod whereby said one end of said torsion rod is rotated about the axis of said selector shaft upon rotation thereof by the vehicle operator, a second shift lever connected to the other end of said torsion rod whereby said second shift lever rotates with said other rod end, a universal pivot support for a portion of said rod intermediate its ends, said support including a universal connection between means adapted to be connected to fixed structure and said rod whereby angular adjustment of each end of said rod is accommodated, and a mechanical connection between the radially outward end of said end lever and ratio-controlling portions of said transmission mechanism, a second torsional rod having a configuration generally similar to the configuration of said first-mentioned torsion rod, a third shift lever adapted to be connected to said selector shaft, a fourth shift lever connected to and movable with the other end of said second torsion rod, a universal pivot connection between means adapted to be connected to fixed structure and an intermediate portion of said second torsion rod, a mechanical connection between the radially outward end of said fourth shift lever and other ratio-controlling portions of said mechanism, and clutch means for selectively engaging and disengaging said first and third shift levers with respect to said selector shaft.

5. The combination set forth in claim 3 including means for mounting said selector shaft for movement in an axial direction as well as for rotary movement about its axis, said clutch means comprising engageable clutch elements carried respectively by said selector shaft and by said first and third shift levers whereby a connection is established between said selector shaft and said first shift lever when said selector shaft is moved to one axial position and a connection is established between said third shift lever and said selector shaft when said selector shaft is moved axially in the opposite direction.

6. The combination set forth in claim 4 including means for mounting said selector shaft for movement in an axial direction as well as for rotary movement about its axis, said clutch means comprising engageable clutch elements carried respectively by said selector shaft and by said first and third shift levers whereby a connection is established between said selector shaft and said first shift lever when said selector shaft is moved to one axial position and a connection is established between said third shift lever and said selector shaft when said selector shaft is moved axially in the opposite direction.

UNITED STATES PATENT OFFICE
CERTIFICATE OF CORRECTION

Patent No. 3,575,061          Dated April 13, 1971

Inventor(s) Benjamin T. Howes

It is certified that error appears in the above-identified patent and that said Letters Patent are hereby corrected as shown below:

Column 4, line 10, insert a period after "drive"; same line, cancel "movement" and substitute --Movement--.

Column 5, line 46, cancel "end" (second occurrence) and substitute --second--.

Column 6, line 30, cancel "end" (second occurrence) and substitute --second--.

Signed and sealed this 9th day of January 1973.

(SEAL)
Attest:

EDWARD M. FLETCHER, JR.          ROBERT GOTTSCHALK
Attesting Officer                    Commissioner of Patents